United States Patent [19]

Kendra

[11] 4,169,690
[45] Oct. 2, 1979

[54] CUTTING INSERT
[75] Inventor: Joseph E. Kendra, Latrobe, Pa.
[73] Assignee: Kennametal Inc., Latrobe, Pa.
[21] Appl. No.: 819,370
[22] Filed: Jul. 26, 1977
[51] Int. Cl.$^2$ .................. B23B 27/08; B23B 29/24; B26D 1/00
[52] U.S. Cl. .................................. 407/90; 407/103; 407/111; 407/113
[58] Field of Search ............... 407/113, 111, 103–105, 407/107, 90, 81

[56] References Cited

U.S. PATENT DOCUMENTS

| | | | |
|---|---|---|---|
| 3,182,534 | 5/1965 | Hoffman | 407/81 |
| 3,436,799 | 4/1969 | Kopy | 407/113 |
| 3,540,332 | 11/1970 | Kvasnicka | 82/36 A |
| 3,613,197 | 10/1971 | Stier | 407/113 |
| 3,829,943 | 8/1974 | Bartoszevicz | 407/113 |

FOREIGN PATENT DOCUMENTS

| | | | |
|---|---|---|---|
| 1215449 | 11/1959 | France | 29/96 |
| 257262 | 10/1970 | U.S.S.R. | 29/96 |

Primary Examiner—Leonidas Vlachos
Attorney, Agent, or Firm—Lawrence R. Burns

[57] ABSTRACT

A cutting insert having a central body portion and a plurality of cutting edge portions extending outwardly therefrom. The cutting edge portions of the insert are successively indexed into position while a special holder is provided to support the cutter in indexed positions thereof.

1 Claim, 6 Drawing Figures

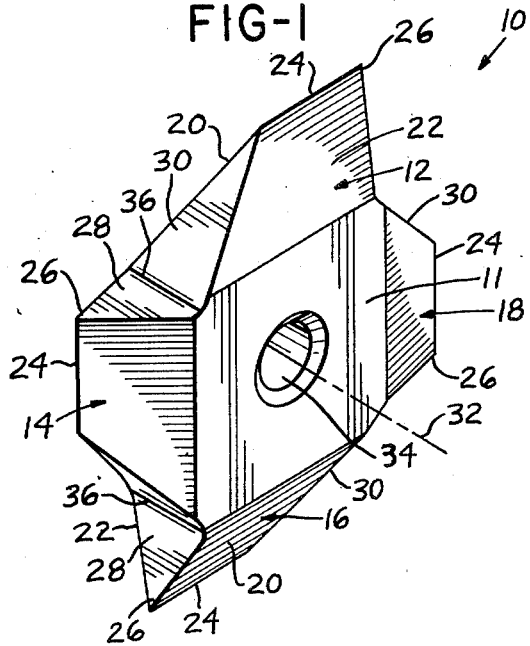
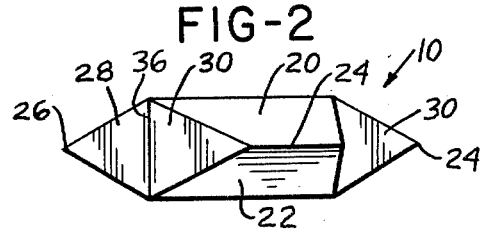
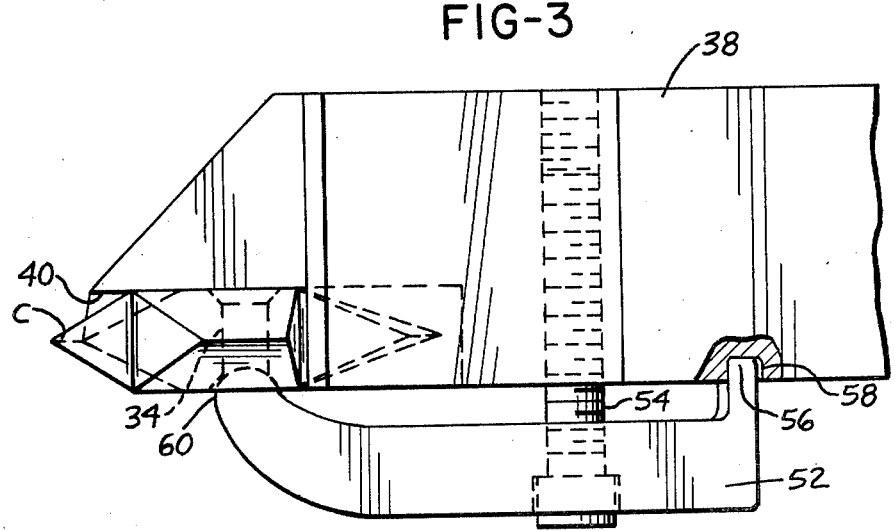

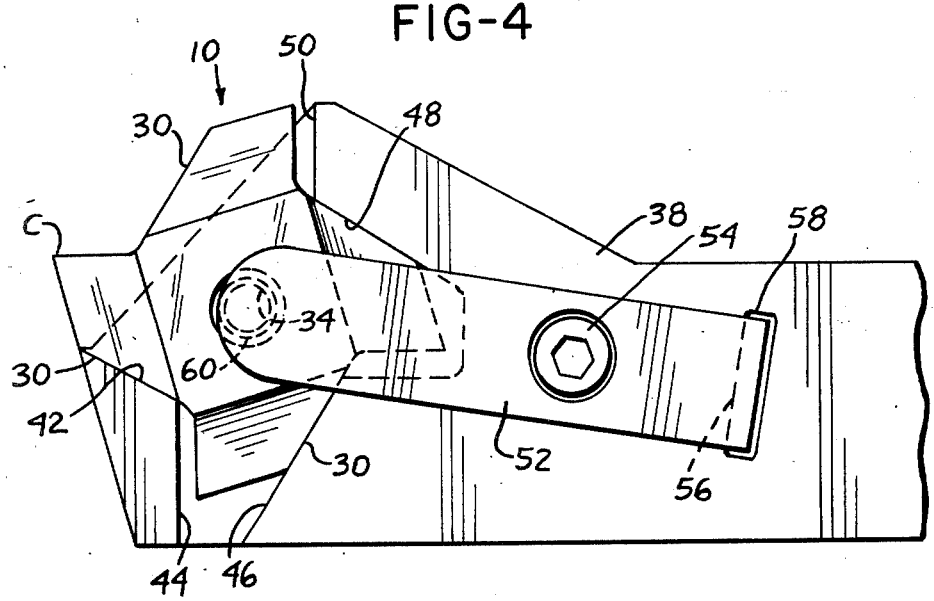
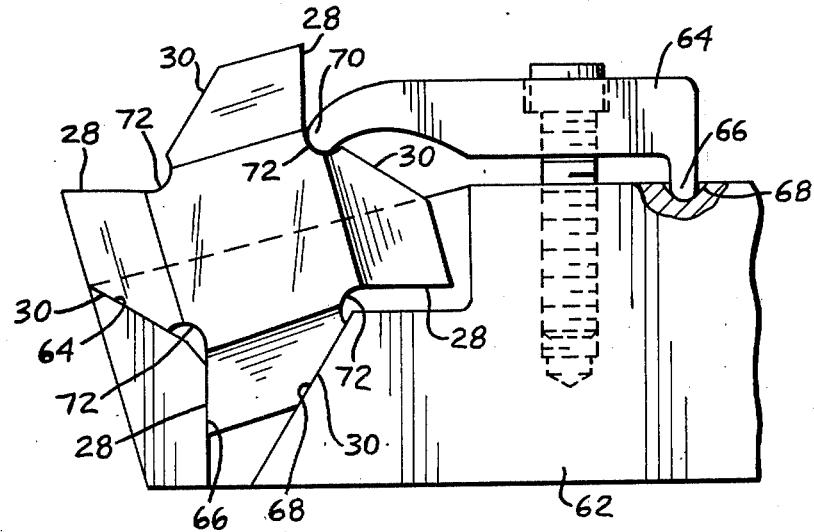
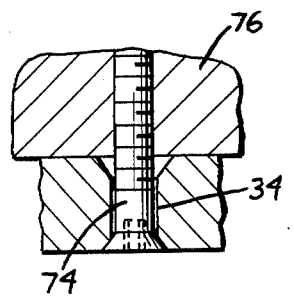

1

CUTTING INSERT

BACKGROUND OF THE INVENTION

The present invention relates to cutting inserts and is particularly concerned with an indexable throw away cutting insert.

Cutting inserts of the type with which the present invention is concerned are formed of cemented hard metal carbides and are quite often discarded when dull rather than being resharpened.

For the reason that the inserts are not resharpened, it becomes important to provide as many cutting edges thereon as is possible while, at the same time, the strength of the insert must be preserved.

A particular object of the present invention is the provision of a throw away cutting insert having heavy duty capabilities which is provided with a plurality of cutting edges.

Another object is the provision of a cutting insert so configured as to provide more cutting edges on a heavy duty insert than have heretofore been possible.

BRIEF SUMMARY OF THE INVENTION

According to the present invention, a cutting insert, preferably of a hard cemented carbide material, such as cemented tungsten carbide or a mixture of hard metal carbides, is provided having a central body portion substantially rectangular in configuration and having spaced parallel side walls. Protruding from the edges of the insert are cutting edge portions, all of which are preferably of the same configuration.

Each cutting edge portion has a forwardly facing side and a rearwardly facing side and the outer tip portion sharpened with the part of the protruding portion rearwardly of the sharpened tip portion relieved while also providing support for the tip portion.

The insert is supported in a holder configured to engage spaced ones of the sides of the cutting portions while exposing the sharpened tip of one cutting portion for engagement with a workpiece.

The exact nature of the present invention will become more clearly apparent upon reference to the following detailed specification taken in connection with the accompanying drawings in which:

FIG. 1 is a perspective view showing an insert according to the present invention.

FIG. 2 is a view looking down on top of FIG. 1 and showing the configuration of the cutting edges of the insert more in detail.

FIG. 3 is a plan view looking down on top of an insert clamped in a holder.

FIG. 4 is a side view of FIG. 3.

FIG. 5 is a view showing another manner of clamping an insert in a holder.

FIG. 6 shows still another arrangement for clamping an insert in a holder.

DETAILED DESCRIPTION OF THE INVENTION

Referring to the drawings somewhat more in detail, the insert 10 according to the present invention has a central body portion 11 which is generally rectangular in configuration and which has a plurality of cutting edge portions 12, 14, 16 and 18 protruding from the edges of the central body portion.

Each cutting edge portion has lateral side walls 20 and 22 which converge in the outward direction and meet in an edge 24 which extends rearwardly from a sharpened forward cutting region 26. The protruding portion has a forwardly facing side 28 and a rearwardly facing side 30 with side 28 tangent to a smaller circle concentric with the central axis 32 of the insert while rearwardly facing wall 30 is tangent to a somewhat larger circle also concentric with axis 32.

The insert may include a central hole 34 for clamping purposes.

As will be seen, each rearwardly facing wall 30 forms a juncture region at 36 with the forwardly facing side of the next following cutting tooth.

The insert referred to is adapted for a clamping in a holder 38 of special configuration in any of several ways.

For example, in FIGS. 3 and 4, the holder 38 is provided with a pocket 40 extending into the side thereof for receiving the insert while the pocket 40 has axial wall regions 42, 44, 46, 48 and 50 distributed circumferentially about the pocket and adapted for engaging at least certain ones of the forwardly facing and rearwardly facing sides of the cutting projection. The cutting insert is thus located in the pocket so that a cutting edge portion, as indicated at C, is exposed for cutting purposes.

The insert is held in the pocket by a clamp arm 52 held in place by clamp screw 54, the clamp arm having one end region 56 engaging a notch 58 in the side of holder 38 while the other end region 60 engages the outer end of the central hole 34 in the insert.

FIG. 5 shows a modified type holder 62 in which a clamp arm 64 is provided having an end 66 engaging a notch 68 in the top of the holder while the other end of the clamp arm comprises a nose portion 70 engaging a respective one of the notch like formations 72 formed at the junctures of the rearwardly facing walls 30 of the cutting portions with the forwardly facing walls 28 of the cutting portions next adjacent thereto.

In the case of the FIG. 5 arrangement, the insert has the sides of certain ones of the projections toward the bottom of the insert engaging the walls 64, 66 and 68 of the holder.

Finally, in FIG. 6, the central hole 34 of the insert is engaged by a clamp screw 74 extending through the hole and threaded into holder 76. The holder 76, in the case of the FIG. 6 modification, will also have surfaces formed therein for engaging certain ones of the front and rear sides of the cutting portions of the insert.

Modifications may be made within the scope of the appended claims.

What is claimed is:

1. In combination: a cutting insert comprising a body of hard wear resistant material having spaced parallel side faces and a plurality of cutting regions on the periphery of said body in circumferentially spaced relation and facing in the circumferential direction, said insert being symmetrical about a central axis perpendicular to said side faces and having a central region bounded by said side faces, said cutting regions extending outwardly from the periphery of said central region, said cutting region having a forward surface and a rearward surface, holder means having support regions for engaging said surfaces to locate said insert in indexed positions thereof about said central axis, clamp means for clamping the insert against said support regions comprising a lever having one end formed to engage a peripheral region of said insert and the other end formed to engage a recess in said holder and a clamp screw extending through an intermediate portion of the lever and threadedly engaging said holder, and a notch formed on the periphery of said insert for engagement with said lever.

* * * * *